United States Patent
Sharma et al.

(10) Patent No.: US 9,742,827 B2
(45) Date of Patent: Aug. 22, 2017

(54) RENDERING RATED MEDIA CONTENT ON CLIENT DEVICES USING PACKET-LEVEL RATINGS

(71) Applicant: Alcatel-Lucent USA Inc., Murray Hill, NJ (US)

(72) Inventors: Ranjan Sharma, New Albany, OH (US); Shengqiang Wang, Cary, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 516 days.

(21) Appl. No.: 14/146,173

(22) Filed: Jan. 2, 2014

(65) Prior Publication Data

US 2015/0188964 A1  Jul. 2, 2015

(51) Int. Cl.
| | |
|---|---|
| *G06F 15/16* | (2006.01) |
| *H04L 29/06* | (2006.01) |
| *H04N 21/44* | (2011.01) |
| *H04N 21/4405* | (2011.01) |
| *H04N 21/454* | (2011.01) |
| *H04N 21/6437* | (2011.01) |
| *H04N 21/845* | (2011.01) |

(52) U.S. Cl.
CPC ............. *H04L 65/60* (2013.01); *H04L 67/42* (2013.01); *H04N 21/44004* (2013.01); *H04N 21/4405* (2013.01); *H04N 21/4542* (2013.01); *H04N 21/6437* (2013.01); *H04N 21/8456* (2013.01)

(58) Field of Classification Search
CPC ... H04L 65/60; H04L 67/42; H04N 21/44004; H04N 21/4405; H04N 21/4542; H04N 21/6437; H04N 21/8456

USPC ................. 709/203, 224, 219, 200
See application file for complete search history.

(56) References Cited

U.S. PATENT DOCUMENTS

| | | | |
|---|---|---|---|
| 6,976,265 B1 | 12/2005 | Yang et al. | |
| 7,359,006 B1* | 4/2008 | Xiang | H04N 21/2368 348/515 |
| 2004/0049780 A1 | 3/2004 | Gee | |
| 2008/0184284 A1 | 7/2008 | O'Hern | |
| 2009/0022120 A1* | 1/2009 | Buer | H04W 12/08 370/338 |
| 2010/0146536 A1* | 6/2010 | Craner | H04N 7/163 725/28 |
| 2010/0287584 A1 | 11/2010 | Starikov et al. | |

(Continued)

FOREIGN PATENT DOCUMENTS

| | | |
|---|---|---|
| EP | 1670204 A2 | 6/2006 |
| EP | 2613492 A1 | 7/2013 |

OTHER PUBLICATIONS

International Search Report & Written Opinion for PCT/US14/71046 dated May 11, 2015; 10 pages.

*Primary Examiner* — El Hadji Sall
(74) *Attorney, Agent, or Firm* — Loza & Loza, LLP (57) ABSTRACT

A content delivery system provides packet-level ratings of media content for use by client devices in rendering the media content thereon. A client device can store a permission level and compare the permission level with respective rating levels included in received media packets. The media content within the received media packets is rendered on the client device on the condition that the permission level compares favorably with the associated rating level and blocked on the condition that the permission level compares unfavorably with the associated rating level.

19 Claims, 5 Drawing Sheets

(56) References Cited

U.S. PATENT DOCUMENTS

| | | | |
|---|---|---|---|
| 2012/0060181 A1* | 3/2012 | Craner | H04N 21/4532 725/28 |
| 2014/0007154 A1* | 1/2014 | Seibold | H04N 21/4122 725/25 |
| 2014/0033036 A1* | 1/2014 | Gaur | H04N 21/4532 715/719 |
| 2014/0208340 A1* | 7/2014 | Poornachandran | H04N 21/44218 725/10 |
| 2015/0189349 A1* | 7/2015 | Nelson | H04N 21/2668 725/28 |

* cited by examiner

Octet 0

RENDERING RATED MEDIA CONTENT ON CLIENT DEVICES USING PACKET-LEVEL RATINGS

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND

Technical Field

This disclosure relates generally to media content distribution systems and in particular, but not exclusively, to systems for rendering rated digital media content on client devices.

Description of Related Art

With today's widespread use of the Internet as a communication medium, end users are able to download media content, such as live or video-on-demand media programs, from content providers onto their viewing device. For example, an end user can access a content provider website, select a particular media program for viewing via the website and download or stream the media program, such as a movie or television show, onto the end user's viewing device.

Most of the media content that is downloaded or streamed to end user devices is rated for viewing by a particular audience. For example, the Motion Picture Association of America (MPAA) uses a film rating system to rate the suitability of movies for certain audiences based on content. The MPAA rating given to a particular film is intended to help parents decide what films are appropriate for their children.

The rating applies to the entire media program, even though there may only be a few scenes considered inappropriate for younger audiences. Since end users typically do not know when inappropriate content may appear in a media program, some end users may opt to not view a particular media program for download when one or more members of a younger audience may potentially be present to view the media program. In addition, the end user viewing experience may be suboptimal if the end user has to pause or turn off portions of the media program when a child enters the room where the media program is being viewed.

To allow the widest audience, content providers often provide multiple copies of the same media program, each with slightly different content and their own overall rating. For example, a content provider may provide an "unrated" version of a media program, along with a PG-13 version of the same media program. Maintaining multiple copies of the same media program increases the storage requirements for content providers, which can result in an increased cost to customers. Moreover, the end user may select the wrong version, leading to customer dissatisfaction.

SUMMARY

Embodiments of the present disclosure are directed to content delivery systems in which media content is rated at the packet level. A media server includes a processor configured to determine a respective rating level assigned to each media segment of media content and to packetize the media content into media packets such that the media packets identify the rating level assigned to the media content. The media server further includes an interface coupled to a network and configured to stream the media packets to a client device via the network.

In another embodiment, an apparatus includes an interface configured to receive media packets from a network, a memory configured to store a permission level and a processor configured to compare the permission level with a rating level of each of the media packets. The processor is further configured to render media content within the media packets on a client device on the condition that the permission level compares favorably with the rating level. The processor is further configured to block the media content within the media packets from being rendered on the client device on the condition that the permission level compares unfavorably with the rating level.

In still another embodiment, a method includes receiving media packets from a network, in which each of the media packets includes media content and identifies a rating level associated with the media content. The method further includes comparing a permission level associated with a client device with the rating level of each of the media packets, rendering the media content within the media packets on the client device on the condition that the permission level compares favorably with the rating level and blocking the media content within the media packets from being rendered on the client device on the condition that the permission level compares unfavorably with the rating level.

In some embodiments of any of the above apparatus/methods, the media packets correspond to at least a portion of a media program.

In some embodiments of any of the above apparatus/methods, a first rating level of a first one of the media packets is different than a second rating level of a second one of the media packets.

In some embodiments of any of the above apparatus/methods, the media content within a first portion of the media packets is rendered on the client device and the media content within a second portion of the media packets is blocked from being rendered on the client device based on the respective rating level of each of the media packets.

In some embodiments of any of the above apparatus/methods, alternative media content is rendered on the client device in place of the media content within the second portion of the media packets.

In some embodiments of any of the above apparatus/methods, the alternative media content is stored at the client device.

In some embodiments of any of the above apparatus/methods, the client device receives the alternative media content from the media server.

Some embodiments of any of the above apparatus/methods further include a buffer within the client device for receiving and storing the media packets.

In some embodiments of any of the above apparatus/methods, the client device further compares the rating level of each of the media packets with the permission level after the media packets are output from the buffer.

In some embodiments of any of the above apparatus/methods, the client device further compares the rating level of each of the media packets with the permission level before the media packets are output from the buffer.

In some embodiments of any of the above apparatus/ methods, the client device selects at least one allowed media packet that has a favorable rating level that compares favorably with the permission level for inclusion in the second portion based on respective positions in the buffer of the at least one allowed media packet and one or more blocked media packets that have unfavorable rating levels that compare unfavorably with the permission level.

In some embodiments of any of the above apparatus/ methods, the media content includes both an audio stream and a video stream.

In some embodiments of any of the above apparatus/ methods, the client device is further configured to render a first media stream and a second media stream of the media content, the first media stream being one of an audio stream and a video stream and the second media stream being the other of the audio stream and the video stream. In this embodiment, the rating level is omitted from additional media packets of the second media stream and the audio stream and the video stream of corresponding media packets having identical timestamp information are rendered on the client device based on the rating level of the first media stream.

In some embodiments of any of the above apparatus/ methods, the permission level is modifiable by an authorized user.

In some embodiments of any of the above apparatus/ methods, each of the media packets includes a header, and the rating level is included within the header.

In some embodiments of any of the above apparatus/ methods, the media packets are real time protocol (RTP) packets, the header includes an RTP header and a variable-length extension appended to the RTP header, and the rating level is included in the variable-length extension.

DETAILED DESCRIPTION

Figure 1:
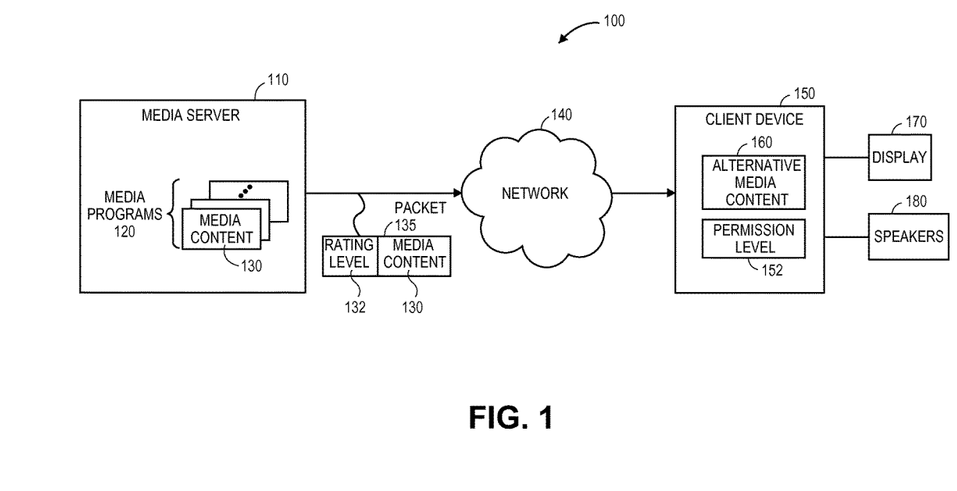
FIG. 1 illustrates a schematic diagram of an embodiment of a content delivery system for rendering rated media content on a client device using packet-level ratings.

FIG. 1 illustrates an embodiment of a content delivery system 100 for rendering rated media content using packet-level ratings. The content delivery system 100 includes a media server 110 and a client device 150. The client device 150 may be, for example, a mobile client device (e.g., a smartphone, tablet or other mobile device), desktop client device (e.g., a desktop computer with an attached monitor), television client device (e.g., a smart TV or set-top box with an attached television) or other type of client device. The client device 150 is coupled to the media server 110 via a network 140. The network 140 may include, for example, one or more of a wired network (e.g., an Internet Protocol (IP) network) and a wireless network (e.g., WiFi, WLAN, 3G, 4G or other type of wireless network).

The media server 110 provides access to one or more media programs 120, each containing digital media content 130 (e.g., audio and/or video content). By way of example, but not limitation, the media programs 120 may include audio recordings, movies, television shows, internet radio, internet audio/visual programs, and/or other multimedia programs. The media server 110 may include a media storage device for storing the media programs 120 or may couple to an external media storage device to retrieve a requested media program 120. The media server 110 may further be integrated with or coupled (via a local or wide area network) to one or more additional network devices, including, for example, a media production device, a web server, a license server and other network devices involved in the delivery of media content to client devices.

In an example embodiment, the client device 150 can access and browse through a catalog of the media programs 120 provided by the media server 110 via the network 140 and select one or more of the media programs 120 for download (typically, upon authentication of the client device 150). After selecting a particular media program 120, in some embodiments, the client device 150 then obtains a Digital Rights Management (DRM) license for the media program 120 prior to the media server 110 commencing with the downloading or streaming of the media program 120 to the client device 150. The media server 110 can provide one or more download/streaming options to the client device 150. For example, the media server 110 may provide for adaptive streaming of the media program 120 to accommodate for bandwidth limitations of the network 140 and/or client device 150. As another example, the media server may provide for a progressive download of the media program 120 that allows the client device 150 to cache the media content 130 for a smoother viewing experience.

To download or stream a media program 120, the media server 110 packetizes the media content 130 of the media program 120 into media packets 135. The media server 110 may further transcode and encrypt the media content 130 and/or include DRM restrictions on the media content 130 prior to packetizing the content 130.

In addition, in at least a portion of the media packets 135, the media server 110 further includes a rating level 132 associated with the media content 130 within that media packet 135. The rating level 132 rates the suitability of the media content 130 for certain audiences. In an example embodiment, the MPAA rating system is used to determine the rating level 132. However, in other embodiments, other rating systems, such as the TV Parental Guidelines system, may be used to determine the rating level 132.

The client device 150 maintains a permission level 152 for that client device 150. The permission level 152 may be pre-stored based on the type of client device or known user of the client device or entered by an authorized user of the client device 150 using, for example, a password. In an example embodiment, an authorized user can set the permission level 152 via a web-based user interface (to remotely set the permission level 152) or a device user interface (e.g., a graphical user interface on a desktop client device, mobile client device or television client device). For example, an authorized user can set the permission level 152 using a remote control device to access a set-top box (STB) client associated with a television coupled to the STB. The permission level 152 may be permanently programmed into the client device or modifiable by the authorized user. For example, in one embodiment, an authorized user is able to temporarily change the permission level 152 based on the expected viewer(s) of the client device 150. In addition, the permission level 152 may include a universal permission level that can be mapped to different rating systems or separate permission levels for each rating system.

The client device 150 receives the media packets 135 from the media server 110 via the network 140 and examines each media packet 135 to ascertain the associated rating level 132. In an embodiment in which a particular media packet 135 does not contain a rating level 132, the client device 150 may treat the absence of a rating level 132 as indicative of a particular predetermined rating level, such as the lowest rating level (e.g., "G-rated," which is associated with media content 130 that is suitable for all viewers). In another embodiment, the rating level 132 may be included only in the first media packet 135 of a segment of the media program 120 having the same rating level 132. The client device 150 may then treat all media packets 135 received subsequent to the first media packet 135 as having the same rating level 132 as the first media packet 135 until another media packet 135 that includes a rating level 132 is received.

The client device 150 further compares the rating level 132 of each received media packet 135 with the stored permission level 152 to determine whether the media content within the media packet 135 may be rendered on the device 150. If the rating level 132 compares favorably with the permission level 152, the client device 150 renders the media content 130 within the media packet 135 onto the client device 150. For example, the media content may be output to a display 170 and speakers 180 integrated with or coupled to the client device 150. If the rating level 132 compares unfavorably with the permission level 152, the client device 150 blocks the media content 130 within the media packet 135 from being rendered on the client device 150.

In an example embodiment, the rating level 132 and permission level 152 are represented as numerical values corresponding to particular rating system classifications. For example, using the MPAA rating system, the rating level 132 and permission level 152 may be as follows:

| Rating/Permission Level | MPAA Classification | Description |
|---|---|---|
| 1 | G | General Guidance |
| 2 | PG | Parental Guidance Suggested |
| 3 | PG-13 | Parents Strongly Cautioned |
| 4 | R | Restricted |
| 5 | NC-17 | No one under 17 allowed |

In this embodiment, the rating level 132 compares favorably with the permission level 152 when the rating level 132 is equal to or less than the permission level 152. For example, if the rating level 132 is "2" (corresponding to "PG") and the permission level 152 is "3" (corresponding to "PG-13"), the media content 130 can be rendered onto the client device 150. Likewise, the rating level 132 compares unfavorably with the permission level 152 when the rating level 132 exceeds the permission level 152.

In other embodiments, the rating level 132 and permission level 152 may be represented by other mechanisms. For example, the levels 132 and 152 may be represented as hexadecimal keys of sufficient complexity and string length to prevent or minimize the risk of the levels 132 and 152 being tampered with.

In still other embodiments, the rating level 132 and permission level 152 may be qualitatively compared to each other. For example, the rating level 132 may compare favorably with the permission level 152 when the rating level 132 of the content is less restrictive or aimed at a younger target audience than the permission level 152.

The client device 150 may further store alternative media content 160 to be rendered on the client device 150 when the received original media content 130 is blocked. Examples of alternative media content 160 include, but are not limited to, one or more of pre-stored text, images, video and/or audio. In other embodiments, the alternative media content 160 may be received from the media server 110 along with the original media content 130 or upon request from the client device 150. For example, the media server 110 can download or stream both the original media content 130 and the alternative media content 160 to the client device 150 substantially simultaneously, and the client device 150 can select from the original media content 130 and alternative media content 160 based on the associated rating levels 132 and the client device permission level 152.

In embodiments in which alternative media content 160 is not available on the client device 150, the client device 150 may not render any content (e.g., the user experiences a black screen with no audio) during the time that the blocked media packets would have been rendered or may discard one or more of the blocked media packets 135 to minimize the amount of time that no content is rendered on the client device 150, thereby optimizing the viewing experience for the user.

Figure 2:
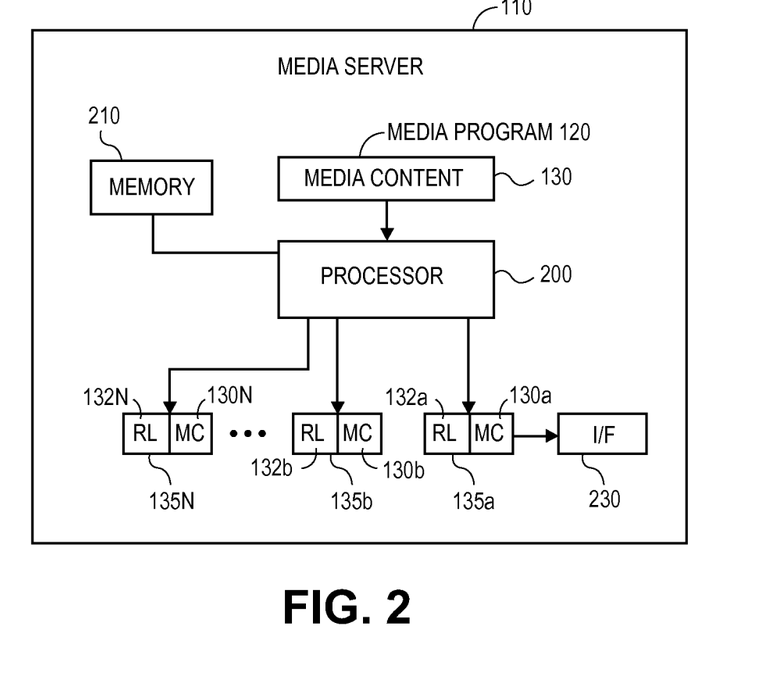
FIG. 2 illustrates a schematic block diagram of an embodiment of media server for packetizing media content with packet-level ratings.

FIG. 2 illustrates a schematic block diagram of an embodiment of media server 110 for packetizing media content with packet-level ratings. The media server 110 includes a processor 200, memory 210 and network interface 220. The processor 200 is operable to process a media program 120 containing media content 130 for streaming or download to one or more client devices. The media program 120 may be stored in memory 210 or retrieved from an external media storage device.

In an example embodiment, the processor 200 packetizes the media content 130 of the media program 120 into a plurality of media packets 135a, 135b . . . 135N. The processor 200 may further transcode and encrypt the media content 130 and/or include DRM restrictions on the media content 130 prior to packetizing the content 130. In addition, in at least a portion of the media packets 135a, 135b . . . 135N, the processor 200 further includes a respective rating level 132a, 132b . . . 132N associated with the media content 130a, 130b . . . 130N within that media packet 135a, 135b . . . 135N. For example, in one embodiment, the MPAA rating system is used to determine the rating level 132a, 132b . . . 132N. However, in other embodiments, other rating systems, such as the TV Parental Guidelines system, may be used to determine the rating level 132a, 132b . . . 132N.

In a further example embodiment, the rating level 132a, 132b . . . 132N of the media content 130a, 130b . . . 130N within each media packet 135a, 135b . . . 135N is determined based on the rating level assigned to the media content 130a, 130b . . . 130N at the studio production stage when the media content is edited to conform to a specific rating. As part of the production editing, rating labels can be assigned to specific segments of the media program, and the assigned rating labels can be stored together with the media content 130.

Figure 3:
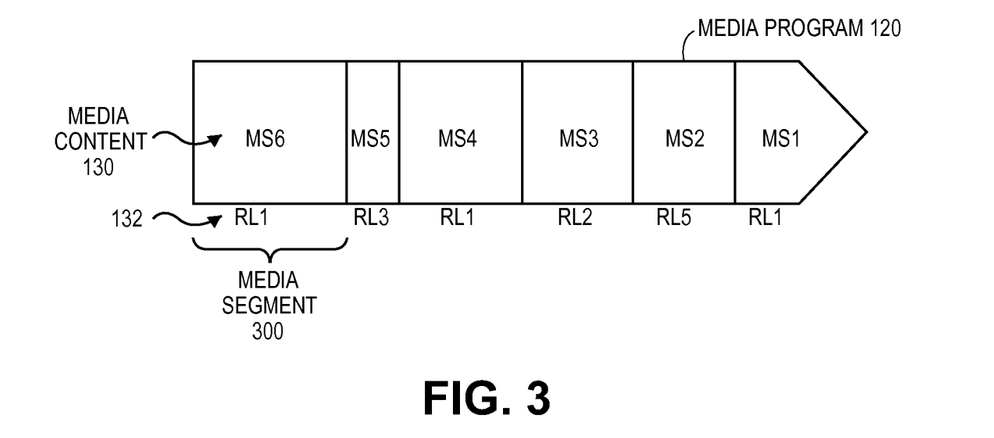
FIG. 3 illustrates a schematic diagram of an embodiment of a media program with different content ratings.

For example, as shown in FIG. 3, during the production stage, different segments 300 of a media program 120 can be tagged or embedded with different rating levels 132. The media segment 300 length is variable and determined based on the media content 130. In an example embodiment, the media program 120 is partitioned into media segments 300, such that adjacent media segments 300 have different rating levels 132 and each media segment 300 includes contiguous media content 130 with the same rating level 132. The contiguous media content 130 may form a complete scene or a portion of a scene in the media program 120. In another example embodiment, the rating level 132 is determined for each scene in the media program 120, such that each media segment 300 includes one or more scenes with the same rating level 132 and adjacent media segments 300 have different rating levels 132. In still another example embodiment, the rating level 132 is determined for each scene, such that each media segment 300 corresponds to a particular scene. In this embodiment, adjacent media segments 300 may have the same rating level 132.

For example, as shown in FIG. 3, a first media segment (MS1) can be tagged with the lowest rating level (RL1), which corresponds to, for example, a "G" rating for the media content 130 within MS1. A second media segment (MS2) can be tagged with the highest rating level RL5, which corresponds to, for example, a "NC-17" rating for all of the media content 130 within MS2. A third media segment (MS3) can be tagged with the rating level RL2, which corresponds to, for example, a "PG" rating for the media content 130 within MS3. A fourth media segment (MS4) can be tagged with the rating level RL1, which again corresponds to a "G" rating for the media content 130 within MS4. A fifth media segment (MS5) can be tagged with the rating level RL3, which corresponds to, for example, a "PG-13" rating for the media content 130 within MS5. Finally, a sixth media segment (MS6) can be tagged with the rating level RL1, which corresponds to a "G" rating for the media content 130 within MS6.

Once the media segments 300 and corresponding rating levels 132 have been determined as part of the media production stage, the media content 130 can be stored with the media segment identifiers and associated rating level tags. Thereafter, the media content 130 within a particular media segment 300 can be packetized into one or more media packets, with one or more of those media packets including the assigned rating level 132 for that media segment 300 for transmission to a client device. For example, in one embodiment, the rating level 132 is included in each media packet of a media segment 300. In another embodiment, only the first media packet in each media segment 300 includes the rating level 132, and the client device applies the received rating level to all media packets received for that media segment 300. In this embodiment, a media segment identifier may also be included in each media packet or the client device may apply the received rating level to all subsequently received media packets until another media packet including a different media level is received.

Figure 4A:
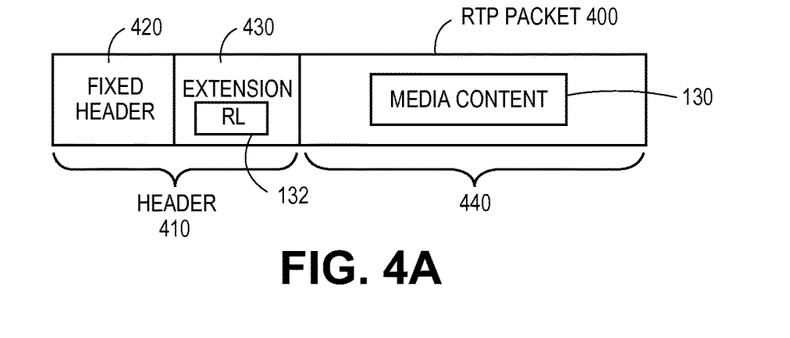
FIG. 4A illustrates a schematic diagram of an embodiment of a media packet including media content and an associated rating level.

FIG. 4A illustrates a schematic diagram of an embodiment of a media packet 400 including media content 130 and an associated rating level 132. The media packet 400 shown in FIG. 4A is a Real-Time Transport Protocol (RTP) packet. However, in other embodiments, other network protocols may be used to transmit or stream media packets containing the media content 130 and associated rating level 132. Examples of other network protocols may include, but are not limited to, Real-Time Streaming Protocol (RTSP), Real-Time Transport Control Protocol (RTCP), Transmission Control Protocol (TCP), unicast protocols, multicast protocols, such as Internet Group Management Protocol (IGMP) or Protocol Independent Multicast (PIM), and Peer-to-Peer (P2P) protocols.

The RTP packet 400 includes a header 410 and payload 440 (body). The media content 130 is included in the payload 440 of the RTP packet 400. The header 410 includes a fixed header 420 and an optional variable-length header extension 430 appended to the fixed header 420. The fixed header 420 is a 12-octet fixed part provided for all RTP packets 400. Therefore, to ensure compatibility with client devices that do not support packet-level ratings, in an example embodiment, the rating level 132 is included in the header extension 430 of the RTP packet 400. In one embodiment, the header extension 430 includes a 16-bit length field counting the number of 32-bit words in the extension 430, and one or more 32-bit words that identify the rating level 132 of the media content 130 within the RTP packet 400.

Since "G" rated segments of the media program allow unrestricted viewing, in one embodiment, the extension header 430 may be excluded for "G" rated content. In this embodiment, the client device treats the absence of the extension 430 as indicative of permission to view and renders the media content 130 in RTP packets 400 without an extension 430 on the client device.

Figures 4B, 5:
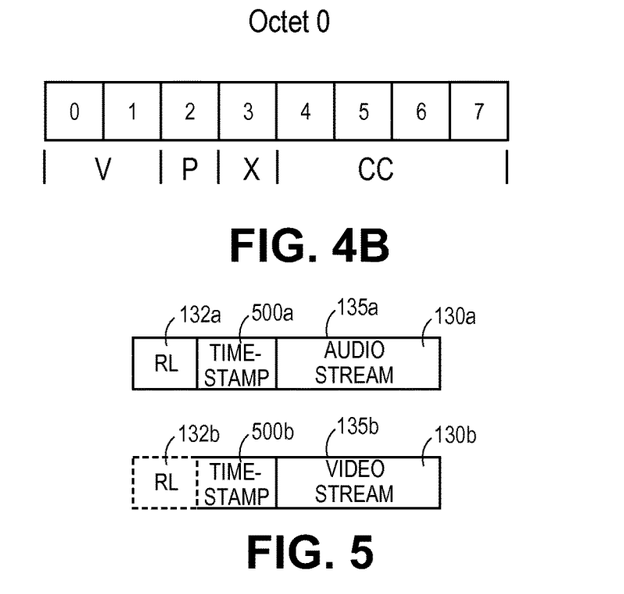
FIG. 4B illustrates a schematic diagram of an example octet of the media packet of FIG. 4A.
FIG. 5 illustrates a schematic diagram of an embodiment of audio and video media packets with associated rating levels.

In embodiments in which the rating level 132 is included in the RTP packet 400, the first octet of the fixed header 420 indicates that the optional header extension 430 is appended to the fixed header 420. The first octet of the fixed header 420 is shown in FIG. 4B. The first two bits identify the version (V) of RTP. In an example embodiment, the version of RTP utilized for packet-level ratings is two (2). The value 1 is used by the first draft version of RTP and the value 0 is used by the protocol initially implemented in the "vat" audio tool. The third bit is the padding (P) bit. If the padding bit is set, the packet contains one or more additional padding octets at the end which are not part of the payload. The last octet of the padding contains a count of how many padding octets should be ignored, including itself. Padding may be needed by some encryption algorithms with fixed block sizes or for carrying several RTP packets in a lower-layer protocol data unit.

The fourth bit is the extension (X) bit. If the extension bit is set, the fixed header is followed by exactly one header extension. The remaining 4 bits in the first octet contain the CSRC count, which indicates the number of CSRC identifiers that follow the fixed header. In an example embodiment, if the packet contains a rating level, the X bit is set to one, and the variable-length extension 430 (shown in FIG. 4A) is appended to the fixed header following the optional CSRC list.

For multimedia programs including both audio content and video content, the audio content and video content are typically streamed separately. For example, as shown in FIG. 5, a first media packet 135a including an audio stream 130a can be transmitted with a first timestamp 500a and a second media packet 135b including a video stream 130b can be transmitted with a second timestamp 500b. The timestamps 500a and 500b are used by the client device to correctly time the output of the audio and video streams on the client device, so that the audio stream is synchronized to the video stream. Thus, the audio stream 130a and video stream 130b having identical timestamps 500a and 500b are output substantially simultaneously for rendering on the client device. In one embodiment, the rating level 132a and 132b is included in both of the audio packets 135a and the video packets 135a for a particular media program. In this embodiment, the rating levels 132a and 132b are identical between corresponding audio packets 135a and video packets 135b (i.e., audio/video packets with identical timestamps 500a and 500b). In other embodiments, the rating level 132a may be included in only the audio packets 135a (as shown in FIG. 5) or only the video packets 135b, and the client device can make the decision to render or block both the audio and video packets having identical timestamp information based on the rating level included in one of the corresponding audio/video packets.

Figure 6:
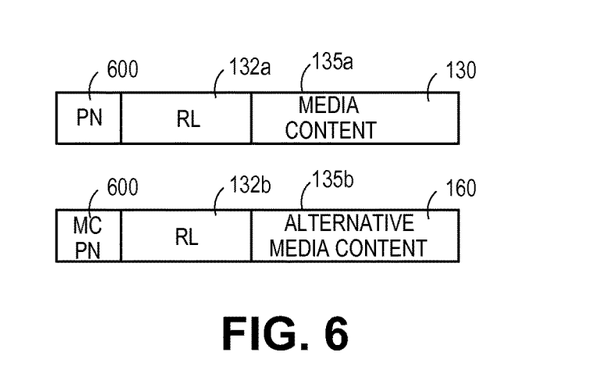
FIG. 6 illustrates a schematic diagram of an embodiment of media packets including original media content and alternative media content.

In certain situations, a content provider may produce different versions of one or more portions of a media program. For example, a content provider may produce an alternate scene with a different rating level than the original scene that may be suitable for a wider audience than the original scene. In this situation, the content provider may make the alternate media content available with the original media content and include the alternate media content in the digital stream of the media program.

For example, as shown in FIG. 6, media packets 135a and 135b including original media content 130 and alternative media content 160, respectively, may be streamed to the client device. The original media content 130 has a first rating level 132a that may not be appropriate for all audiences, while the alternative media content 160 has a second rating level 132b that is appropriate for all audiences. In one embodiment, the media packet 135b containing the alternative media content 160 may be associated with the media packet 135a containing the original media content 160 by including the packet number 600 of the original media packet 135a within the alternative media packet 135b. In other embodiments, the original and alternative media content can be associated with one another using other mechanisms to ensure that the client device renders only one of the original media content 130 and the alternative media content 160 on the client device. For example, based on the respective rating levels 132a and 132b of the original media content and the alternative media content 160 and the permission level allocated to the client device, the client device can render either the original media content 130 or the alternative media content 160 thereon.

Figure 7:
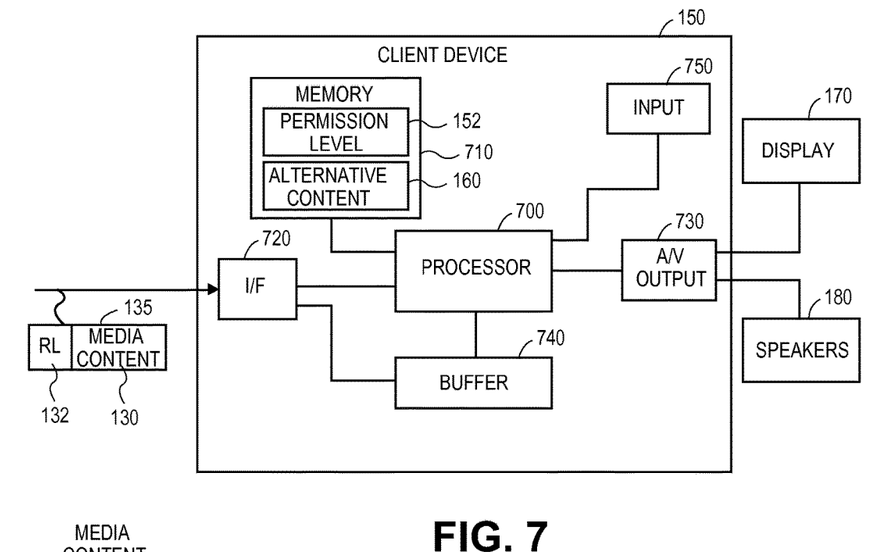
FIG. 7 illustrates a schematic block diagram of an embodiment of a client device for rendering rated media content using packet-level ratings.

FIG. 7 illustrates a schematic block diagram of an embodiment of a client device 150 for rendering rated media content using packet-level ratings. The client device 150 includes a processor 700, memory 710, interface 720, audio/video (A/V) output 730, buffer 740 and input 750. The memory 710 stores a permission level 152 assigned to the client device 150.

The permission level 152 may be pre-stored based on the type of client device 150 or the known user of the client device 150 or may be entered by an authorized user of the client device 150 using, for example, a password. In an example embodiment, an authorized user can set the permission level 152 using the input 750, which may be, for example, a remote control sensor, keyboard or keypad, and a device graphical user interface (e.g., a graphical user interface on a desktop client device, mobile client device or television client device). In another embodiment, the authorized user can set the permission level 152 via a web-based or other wireless user interface to remotely set the permission level 152.

The permission level 152 may be permanently programmed into the client device or modifiable by the authorized user. For example, in one embodiment, an authorized user is able to temporarily change the permission level 152 based on the expected viewer(s) of the client device 150. In addition, the permission level 152 may include a universal permission level that can be mapped to different rating systems or separate permission levels for each rating system.

The interface 720 is coupled to a network to receive a media packet 135 including media content 130 and an associated rating level 132. The interface 720 may be, for example, a wired interface coupled to a wired network or a wireless interface coupled to a wireless network. For downloaded media content 130, the interface 720 provides the media packet 135 to the processor 700 for processing and storage within memory 710 to enable subsequent processing and rendering of the media content 130 on the client device 150. For streamed media content 130, the interface 720 provides the media packet 135 to the buffer 740 for real-time processing and rendering of the media content 130 on the client device 150 via the A/V output 730 to an integrated or coupled display 170 and speakers 180.

Prior to rendering the media content 130 on the client device 150, the processor 700 compares the rating level 132 of the received media content 130 with the permission level 152 assigned to the client device 150. The processor 700 can perform this comparison at the output of the buffer 740 (e.g., on media packets exiting the buffer 740) or within the buffer 740 (e.g., on media packets at a particular position within the buffer 740). When the rating level 132 compares favorably with the permission level 152, the client device 150 renders the media content 130 within the media packet 135 onto the client device 150. However, when the rating level 132 compares unfavorably with the permission level 152, the client device 150 blocks the media content 130 within the media packet 135 from being rendered on the client device 150.

In an example embodiment, when the media content 130 is blocked from being rendered, the processor 700 renders alternative content 160 onto the client device 150 in place of the blocked media content 130. The alternative content 160 may be pre-stored within memory 710 or may be received via the interface 720. Examples of pre-stored alternative media content 160 include, but are not limited to, one or more of pre-stored text, images, video and/or audio. In embodiments in which the alternative media content 160 is received via the interface 720, the alternative media content 160 can be received along with the original media content 130 or upon request from the client device 150. For example, the original media content 130 and the alternative media content 160 can both be downloaded or streamed to the client device 150 substantially simultaneously, and the processor 700 can select from the original media content 130 and alternative media content 160 based on the associated rating levels 132 and the client device permission level 152.

In embodiments in which alternative media content 160 is not available on the client device 150, the processor 700 may not render any content (e.g., the user experiences a black screen with no audio) during the time that the blocked media packets would have been rendered or may discard one or more of the blocked media packets 135 to minimize the amount of time that no content is rendered on the client device 150, thereby optimizing the viewing experience for the user.

Figure 8:
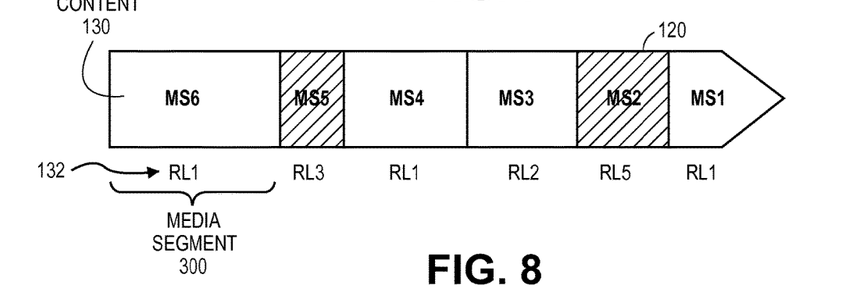
FIG. 8 illustrates a schematic diagram of an embodiment of a media program with blocked media content based on associated rating levels.

FIG. 8 illustrates a schematic diagram of an embodiment of a media program 120 with blocked media content 130 based on associated rating levels 132. The media program 120 corresponds to the one shown in FIG. 3 with the same media segments 300 and associated rating levels 132. Assuming the permission level granted to the client device corresponds to MPAA level 2 (or "PG"), as can be seen in FIG. 8, the media content 130 within MS2, having a rating level of RL5, and MS5, having a rating level of RL3, are blocked from being rendered on the client device. Thus, the media content 130 within each media packet corresponding to MS2 or MS5 is blocked.

Referring again to FIG. 7, in a further example embodiment, the processor 700 is programmed to allow for further optimization of the viewing experience by blocking the media content 130 even when the rating level 132 compares favorably with the permission level 152. For example, the memory 710 may further maintain a threshold value corresponding to a percentage of media content or media packets of an entire media program or portion of a media program that must compare favorably with the permission level in order for any media packets of the media program to be rendered on the client device. In one embodiment, the percent of media content at each rating level can be sent prior to download/streaming to enable the client device to determine whether to initiate the download/stream process based on the threshold value. In another embodiment, the percent of media content at one or more rating levels can be determined during download/streaming. In this embodiment, the processor 700 may execute a buffer look-ahead function to determine whether to continue streaming based on the initial contents of the buffer 740.

As another example, the processor 700 may be programmed to prevent flickering of the screen back and forth between the alternative content 160 and allowed media content 130. In this example, the processor 700 may block the media content 130 within the media packet 135 from being rendered based on the rating level(s) of nearby media packets within the buffer 740, regardless of the rating level 132 of the media content 130 itself. Thus, the processor 700 may execute a buffer look-ahead function that enables the processor 700 to analyze the rating level 132 of multiple packets within the buffer 740 to determine whether to block or render the media content 130 within a particular media packet 135 in the buffer 740.

Figure 9:
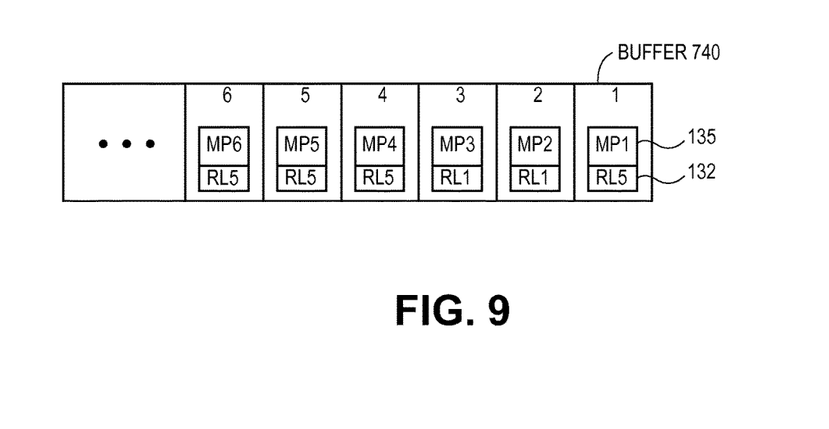
FIG. 9 illustrates a schematic diagram of an embodiment of a buffer including received media packets with associated rating levels.

For example, as shown in FIG. 9, the buffer 740 can maintain a plurality of media packets 135, each having a respective rating level 132 associated therewith. The media packets 135 in the first, fourth, fifth and sixth buffer positions (MP1, MP4, MP5 and MP6) have a rating level of RL5, while the media packets in the second and third buffer positions (MP2 and MP3) have a rating level of RL1. Although the RL1 rating level typically enables rendering of the associated media content on the client device, to prevent rapid flickering, the media content within MP2 an MP3 may be blocked.

Figure 10:
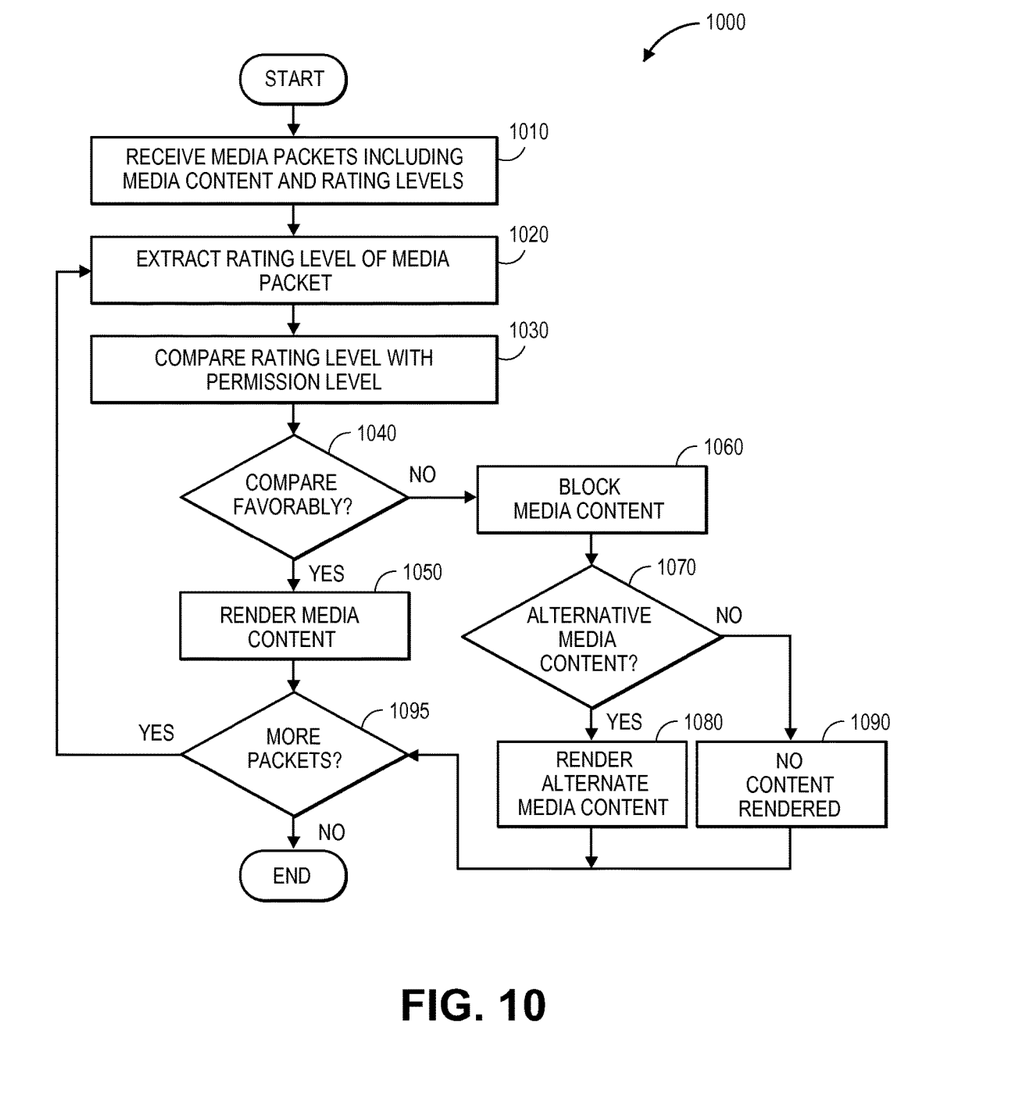
FIG. 10 is a flowchart illustrating an embodiment of a method for rendering rated media content on a client device.

FIG. 10 is a flowchart illustrating an embodiment of a method 1000 for rendering rated media content on a client device. The method begins at 1010, where media packets including media content and associated rating levels are received at the client device. At 1020, the rating level of a media packet is extracted, and at 1030, the rating level is compared with a permission level for the client device. At 1040, if the rating level compares favorably with the permission level, at 1050, the media content within that media packet is rendered on the client device.

However, if the rating level does not compare favorably with the permission level, at 1060, the media content within that media packet is blocked from being rendered on the client device. At 1070, if alternative content is available (e.g., either pre-stored or substantially simultaneously received), at 1080, the alternative media content is rendered on the client device. If no alternative media content is available, at 1090, no content is rendered on the client device. At 1095, this process is repeated for each received media packet.

As may be used herein, the term "processor" is defined as either a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor may further access an external memory device and/or include an integrated memory device, which may be a single memory device, a plurality of memory devices, and/or embedded circuitry of another processor. Such an integrated memory device and/or an external memory device may be a read-only memory, random access memory, volatile memory, non-volatile memory, static memory, dynamic memory, flash memory, cache memory, and/or any device that stores digital information. Note that the memory device may store, and the processor may execute, hard coded and/or operational instructions corresponding to at least some of the steps and/or functions described herein. Such a memory device can further be included in an article of manufacture.

As may further be used herein, the term "substantially" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences.

As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An apparatus, comprising:
   an interface of a client device configured to receive media packets from a network;
   a memory configured to store a permission level;
   a buffer configured to receive and store media packets of streamed media content; and
   a processor configured to:
      compare the permission level with a rating level of each of the media packets before the media packets are output from the buffer;
      render the media content within a first portion of the media packets on the client device and to block the media content within a second portion of the media packets from being rendered on the client device based on the respective rating level of each of the media packets; and
      select at least one allowed media packet that has a favorable rating level that compares favorably with the permission level for inclusion in the second portion based on respective positions in the buffer of the at least one allowed media packet and one or more blocked media packets that have rating levels that compare unfavorably with the permission level.

2. The apparatus of claim 1, wherein the media packets correspond to at least the first portion and the second portion of a media program.

3. The apparatus of claim 1, wherein a first rating level of the first portion of the media packets is different than a second rating level of the second portion of the media packets.

4. The apparatus of claim 1, wherein the processor is configured to render the media content within the first portion of the media packets on the client device and to block the media content within the second portion of the media packets from being rendered on the client device based on the respective rating level of each of the media packets.

5. The apparatus of claim 4, wherein the processor is further configured to render alternative media content on the client device in place of the media content within the second portion of the media packets.

6. The apparatus of claim 5, wherein the memory is further configured to store the alternative media content.

7. The apparatus of claim 5, wherein the interface is further configured to receive the alternative media content via the network.

8. The apparatus of claim 5, wherein the processor is further configured to compare the rating level of each of the media packets with the permission level after the media packets are output from the buffer.

9. The apparatus of claim 5, wherein the processor is further configured to compare the rating level of each of the media packets with the permission level before the media packets are output from the buffer.

10. The apparatus of claim 1, wherein the media content includes both an audio stream and a video stream.

11. The apparatus of claim 1, wherein the processor is further configured to render a first media stream and a second media stream of the media content, the first media stream being one of an audio stream and a video stream and the second media stream being the other of the audio stream and the video stream, the rating level being omitted from additional media packets of the second media stream, the rendering including rendering the audio stream and the video stream of corresponding media packets having identical timestamp information on the client device based on the rating level of the first media stream.

12. The apparatus of claim 1, wherein the permission level is modifiable by an authorized user.

13. The apparatus of claim 1, wherein the processor is further configured to determine the rating level of each of the media packets from a header included with each of the media packets.

14. The apparatus of claim 13, wherein the processor is further configured to determine the rating level from a variable-length extension appended to a real time protocol (RTP) header of RTP packets of the media packets.

15. A media server, comprising:
   a processor configured to:
      determine a respective rating level assigned to each of a plurality of media segments of a media program and to packetize the plurality of media segments into media packets such that the media packets identify the respective rating level assigned to the media segment;
      packetize an alternative media segment corresponding to at least a first one of the plurality of media segments of the media program into alternative media packets, wherein the alternative media segment has a different rating level than the corresponding first one of the plurality of media segments; and
   an interface coupled to a network and configured to concurrently stream the media packets and the alternative media packets to the client device via the network.

16. The media server of claim 15, wherein the processor is further configured to transmit a percent of the media packets of the media segments at each of the plurality of rating levels to the client device via the network.

17. The media server of claim 15, wherein the processor is further configured to packetize media packets as real time protocol (RTP) packets, each including an RTP header and a variable-length extension appended to the RTP header, the rating level being included in the variable-length extension.

18. A method, comprising:
   receiving a stream of media content including a plurality of media segments from a network at a client device, wherein the plurality of media segments includes a first set of media packets of a media segment having a first rating level and an alternative set of media packets of the same media segment having a second rating level;

storing the media packets in a buffer;

comparing, by a processor, a permission level associated with a client device with the rating level of each of the media packets in the buffer to determine whether to render the media packets in the buffer;

rendering, by the processor, the first set of media packets of the media segment having the first rating level from the buffer on the client device on the condition that the permission level compares favorably with the first rating level; and blocking, by the processor, the first set of media packets of the media segment having the first rating level from being rendered on the client device on the condition that the permission level compares unfavorably with the first rating level and rendering the alternative set of media packets of the same media segment from the buffer having a second rating level on the condition that the permission level compares favorably with the second rating level.

19. The method of claim 18, comprising:

receiving the first set of media packets of the media segment and the alternative set of media packets of the same media segment in the stream of media content substantially concurrently.

* * * * *